US008954745B2

(12) United States Patent
Cook et al.

(10) Patent No.: US 8,954,745 B2
(45) Date of Patent: Feb. 10, 2015

(54) METHOD AND APPARATUS FOR GENERATING ONE-TIME PASSWORDS

(75) Inventors: Debra L. Cook, Tinton Falls, NJ (US);
Vijay K. Gurbani, Lisle, IL (US);
Maarten Wegdam, Borne (NL)

(73) Assignee: Alcatel Lucent, Boulogne-Billancourt (FR)

( * ) Notice: Subject to any disclaimer, the term of this patent is extended or adjusted under 35 U.S.C. 154(b) by 1685 days.

(21) Appl. No.: 11/732,199

(22) Filed: Apr. 3, 2007

(65) Prior Publication Data
US 2009/0328165 A1 Dec. 31, 2009

(51) Int. Cl.
*H04L 9/08* (2006.01)
*H04L 29/06* (2006.01)
*G06F 21/44* (2013.01)

(52) U.S. Cl.
CPC .......... *H04L 63/0838* (2013.01); *G06F 21/445* (2013.01); *H04L 9/0869* (2013.01); *H04L 9/0863* (2013.01); *H04L 63/1483* (2013.01)
USPC ........... 713/184; 713/182; 713/183; 713/185; 726/9; 726/20; 380/44; 380/46; 380/47

(58) Field of Classification Search
CPC .................................................. H04L 9/0863
USPC .............................................. 713/184; 726/6
See application file for complete search history.

(56) References Cited

U.S. PATENT DOCUMENTS

| 2001/0036273 A1* | 11/2001 | Yoshizawa | 380/247 |
| 2002/0113824 A1* | 8/2002 | Myers, Jr. | 345/810 |
| 2002/0194478 A1* | 12/2002 | MacKenzie | 713/171 |
| 2005/0069137 A1* | 3/2005 | Landrock | 380/278 |
| 2006/0015725 A1* | 1/2006 | Voice et al. | 713/168 |
| 2006/0041759 A1 | 2/2006 | Kaliski, Jr. | |
| 2006/0064588 A1* | 3/2006 | Tidwell et al. | 713/169 |
| 2006/0282662 A1* | 12/2006 | Whitcomb | 713/156 |
| 2007/0011724 A1 | 1/2007 | Gonzalez | |
| 2007/0022196 A1* | 1/2007 | Agrawal | 709/225 |

(Continued)

FOREIGN PATENT DOCUMENTS

| WO | WO 2006/121854 | 11/2006 |
| WO | WO 2007/106679 | 9/2007 |

OTHER PUBLICATIONS

Hallsteinsen, S.; Jorstad, I; Do van Thanh, "Using the mobile phone as a security token for unified authentication," Systems and Networks Communications, 2007. ICSNC 2007. Second International Conference on , vol., No., pp. 68,68, Aug. 25-31, 2007.*

(Continued)

*Primary Examiner* — Alexander Lagor
(74) *Attorney, Agent, or Firm* — Carmen Patti Law Group, LLC

(57) ABSTRACT

A method and apparatus are provided to allow a user of a communications device to utilize one-time password generators for two-way authentication of users and servers, i.e., proving to users that servers are genuine and proving to servers that users are genuine. The present invention removes the need for a user to have a separate physical device, e.g., token, per company or service, reduces the cost burden on the companies and allows for two-way authentication via multiple access methods, e.g., telephone, web interfaces, automatic teller machines (ATMs), etc. Also, the present invention may be utilized in consumer and enterprise applications.

27 Claims, 4 Drawing Sheets

(56) References Cited

U.S. PATENT DOCUMENTS

2007/0186103 A1* 8/2007 Randle et al. ............... 713/168
2007/0220253 A1* 9/2007 Law ........................... 713/168
2008/0055256 A1* 3/2008 Kwong et al. ............... 345/173
2008/0098464 A1* 4/2008 Mizrah ......................... 726/5

OTHER PUBLICATIONS

Aloul, F.; Zahidi, S.; El-Hajj, W., "Two factor authentication using mobile phones," Computer Systems and Applications, 2009. AICCSA 2009. IEEE/ACS International Conference on , vol., No., pp. 641,644, May 10-13, 2009.*

* cited by examiner

METHOD AND APPARATUS FOR GENERATING ONE-TIME PASSWORDS

TECHNICAL FIELD

This invention relates to the art of authentication, and more particularly to a method of providing two-way authentication of passwords used for user applications.

BACKGROUND

Commercial one-time password generators have been widely used in industry for over a decade, but have not seen widespread use in consumer applications such as online banking and brokerage account management, especially within the United States. The use of one-time passwords for access to sensitive information eliminates both the need for a user to remember passwords that are difficult to guess and the tendency for users to use the same password for multiple accounts and never change passwords. However, it requires a user and an entity, e.g., a bank or brokerage firm, that is authenticating the user to both have access to the same sequence of one-time passwords.

In a token based approach, a company may provide a token to the user as part of a two-part authentication process for accessing a single account. A token is a device or software that contains one or more sequence generators. A sequence generator is an algorithm that generates a pseudorandom sequence of numeric or alpha-numeric values of 6 to 8 digits. The sequence generator uses the current value to compute the next value.

A server generates and maintains the same pseudorandom sequence generated by the token. Each value remains valid for a short time period, e.g., one minute. The user may be authenticated by entering a static personal identification number (PIN) along with the current value from the sequence generator as a password when accessing the entity. The PIN prevents someone else from using the token to access a user's account. The server will verify that the value entered by the user, combined with the pin, matches the current value in the sequence.

Disadvantageously, the cost of providing a token to each customer makes the use of tokens unappealing to businesses having a large customer base. Also disadvantageously, administrative issues, such as a) how to deal with lost or stolen tokens, b) aging tokens that must be replaced periodically, c) tokens that become out-of-synch with the server, and d) tokens that stop working prior to the expiration date as its power supply dies, make the use of tokens unappealing to some businesses. Further disadvantageously, the need to have a separate token or device per account is unappealing from the customer's perspective, no matter how compact the device is physically.

An alternative to providing a token to customers is to use some form of out-of-band communication, such as Short Message Service (SMS), to provide consumers with one-time passwords. Disadvantageously, this alternative relies on the out-of-band communication, which may fail, become slow or vulnerable to attacks.

SUMMARY

It has been recognized, in accordance with the principles of the invention, that the problems of the prior art can be overcome by a technique that allows a user of a communications device to utilize one-time password generators for two-way authentication of users and servers, i.e., proving to users that servers are genuine and proving to servers that users are genuine. More specifically, the present invention provides a method having the steps of a) generating a pseudorandom sequence of values from one of multiple sequence generators in a communications device, wherein each of the multiple sequence generators provides access to a different one of the one or more accounts of the user, and b) transmitting a personal identification number (PIN) concatenated with the pseudorandom sequence of values to a server having a sequence generator assigned to the user.

Also, the present invention provides a communications device operable to a) generate a pseudorandom sequence of values from one of multiple sequence generators in the communications device, wherein each of the multiple sequence generators provides access to a different one of one or more accounts of a user and b) transmit a personal identification number (PIN) concatenated with the pseudorandom sequence of values to a server having a sequence generator assigned to the user.

DETAILED DESCRIPTION

The present invention allows a user of a communications device to utilize one-time password generators for two-way authentication of users and servers, i.e., proving to users that servers are genuine and proving to servers that users are genuine. Also, the present invention removes the need for a user to have a separate physical device, e.g., token, per company or service, reduces the cost burden on the companies, and allows for two-way authentication via multiple access methods, e.g., telephone, web interfaces, automatic teller machines (ATMs), etc. Furthermore, the present invention may be utilized in consumer and enterprise applications.

For ease of explanation, the method of the present invention will be explained in the context of a communications device which may be a small, light-weight portable mobile telephone, e.g., pocket telephone, capable of sending and receiving voice calls, email, short message service (SMS), microbrowser messages or text messaging. In one embodiment, the present invention may be implemented as an add-in application on the mobile telephone and operate in conjunction with an existing application resident on the mobile telephone. In an alternative embodiment, the present invention may be implemented as an enhancement to an existing application on the mobile telephone. In yet another embodiment, the present invention may be implemented as a replacement for an existing application on the mobile telephone.

It will be readily understood that the method of the present invention is not limited to a mobile "pocket" telephone. In another embodiment of the invention, the communications device may be a mobile telephone installed in an engine-driven vehicle and supplied with current from the vehicle electrical system. In yet another embodiment of the invention, the communications device may be a personal digital assistance (PDA) device, a two-way pager, a notebook computer, a portable media player that allows an addition of executable programs, or other suitable handheld communications devices. In an alternative embodiment of the invention, the device may be a simple user interface that can reset, initialize and select sequence generators.

Figure 1:
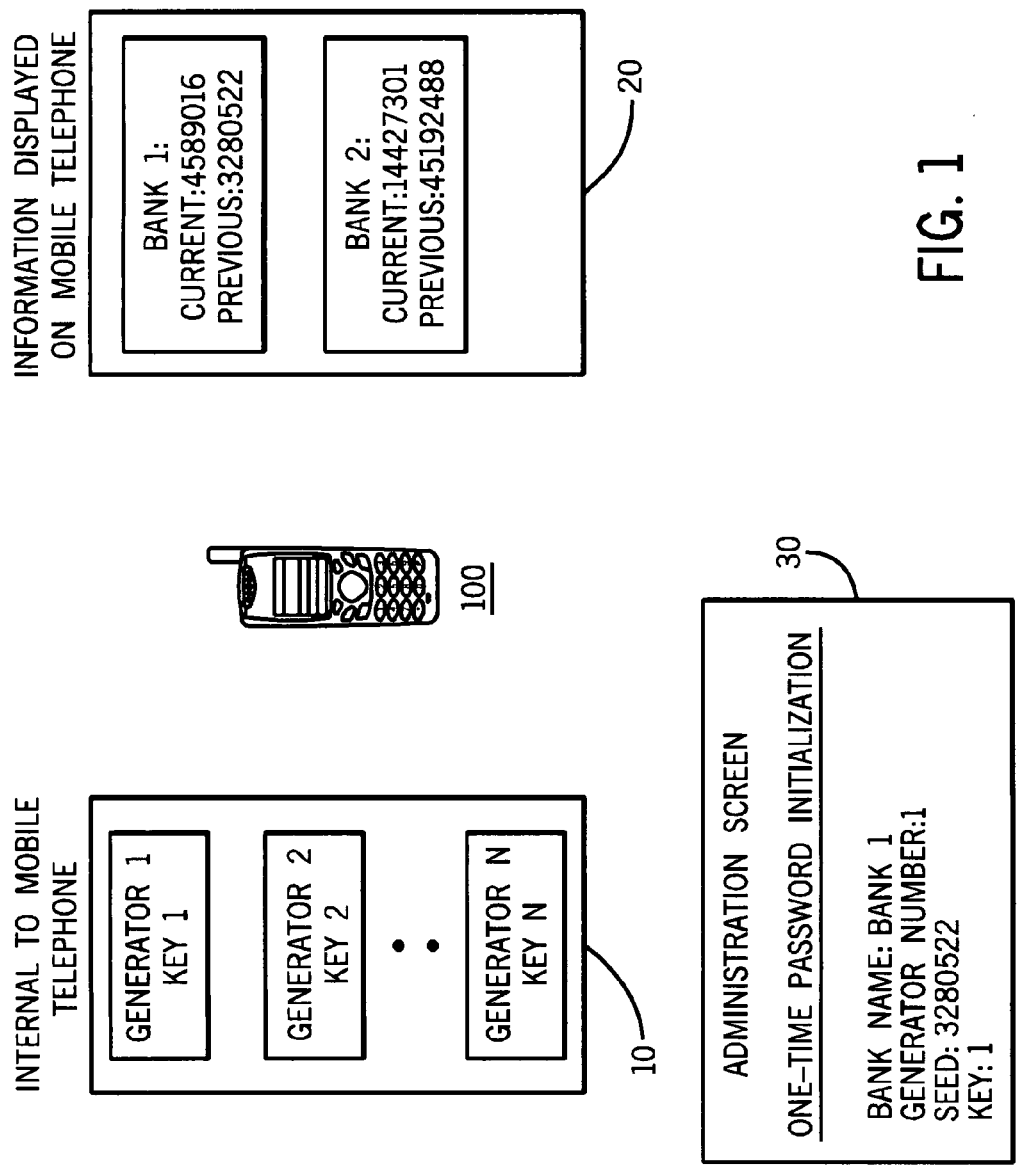
FIG. 1 shows an illustrative view of a communications device arranged in accordance with the principles of the invention.

FIG. 1 shows an illustrative view of a mobile telephone arranged in accordance with the principles of the invention. As shown in FIG. 1, mobile telephone 100 has an internal area 10, display 20, and Administrative Screen 30. Multiple instances of a sequence generator, i.e., Generator 1, Generator 2 and Generator N, reside in internal area 10 of mobile telephone 100. The output, i.e., a current sequence value and the previous sequence value, of each active sequence generator is shown on display 20 along with the name of a company having an account of the user. The user interface of mobile telephone 100 may include an audio interface, such as a microphone and speakers, a visual interface, such as display 20, and a user input interface, such as a keyboard or touch pad. Mobile telephone 100 is capable of sending and receiving voice calls, email messages, short message service (SMS), microbrowser messages or text messaging. Also, mobile telephone 100 may load Internet web pages and transfer files with servers.

The multiple instances of the sequence generator may be based on a standard algorithm such as the Advanced Encryption Standard (AES). Each sequence generator encrypts a seed, i.e., an initial string of digits, with AES using a 16 byte key supplied by the user to the sequence generator to produce a separate pseudorandom sequence of alphabetical, numeric or alpha-numeric values of 6 to 8 digits. Also, each sequence generator computes the next value, i.e., a different pseudorandom sequence of values, after a predetermined interval, e.g., 30 seconds, which may be variable by the user. Illustratively, one method to compute the next value is to have AES repeatedly encrypt the output of a previous encryption step, starting with the seed. This resulting ciphertext is then converted into a 6 or 8 digit value to be displayed to the user.

The multiple instances of the sequence generator on mobile telephone 100 may be used to access multiple accounts of a user. The user may assign each one of the multiple instances of the sequence generator to one or more service entities, e.g., banks, brokerage firms, etc., having an account of the user via Administrative Screen 30 on mobile telephone 100. Illustratively, Administrative Screen 30 shows that Generator 1 has been assigned to Bank 1. Generator 2, shown in internal area 20, corresponds to Bank 2. Generator N has not been assigned. Also, assignment requires the user to provide an administrator of a server for a particular service entity a) a seed to a specific sequence generator on mobile telephone 100, b) a key for the specific generator and c) a current sequence value displayed by the specific sequence generator, in order to initiate the process and to synchronize the specific sequence generator with the server of the service entity running a sequence generator for each customer. Furthermore, the server is required to store the user's login identification (ID) and PIN. In a sense, the user provides a token to the service entity as opposed to the service entity providing a token to the user as in the prior art. The user's one-time password consists of a personal identification number (PIN) of the user concatenated with the current sequence value displayed by the sequence generator.

The present invention provides a verification algorithm to account for some time variance between the sequence generator and a server, since the server may drift over time and not be synchronized with the sequence generator to the exact second.

The present invention may have an executable program which is loaded into a memory, not shown, of mobile telephone 100 when mobile telephone 100 is turned on. The executable program provides access to sequence generators that have been preconfigured by the user on mobile telephone 100. The user may view the sequence generators on display 20, and a scroll bar or a similar device may be used to view entries that do not fit entirely in display 20. The user may select the sequence generator by pressing keys on a handset of mobile telephone 100, or by touching a touch screen on display 20 or, if mobile telephone 100 has speech recognition capabilities, then the user may select the sequence generator via a voice response.

Mobile telephone 100 may allow the user to reseed/reset the sequence generator so that the sequence generator may be reused with a second service entity, upon closing an account with a first service entity. Also, the user may use the one-time passwords for any access method the service entity supports, such as a toll free telephone dial-in line, automatic teller machines (ATMs), and a web interface. The user may enter the pseudorandom sequence value manually or have the sequence generator automatically communicate a number, depending on the capabilities of both the sequence generator and the interface into which it is entered.

Figure 2:
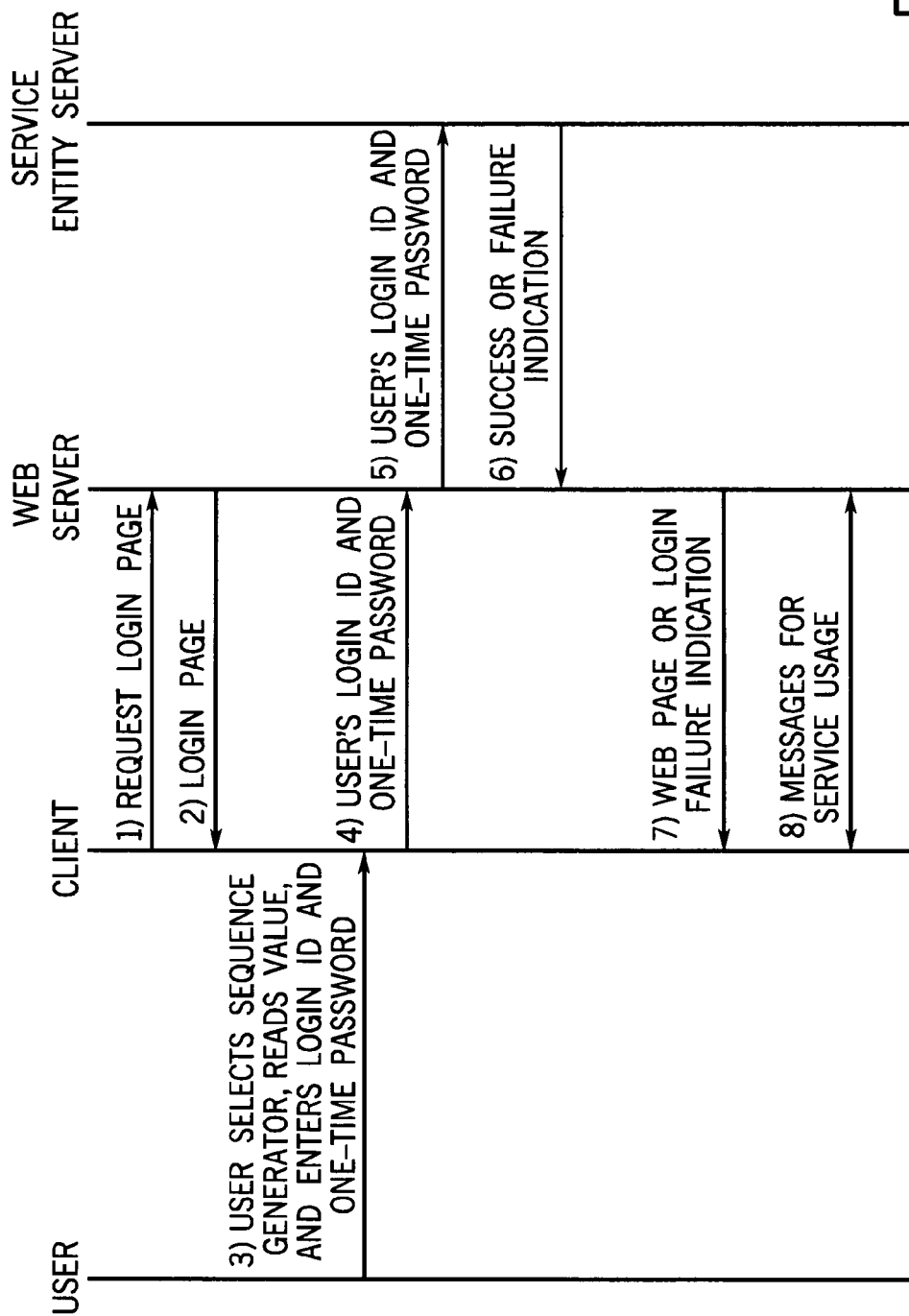
FIG. 2 shows an illustrative call flow for a method of operating the present invention arranged in accordance with the principles of the invention.

FIG. 2 shows an illustrative call flow for a method of operating the present invention arranged in accordance with the principles of the invention. Specifically, FIG. 2 illustrates one way authentication of a user by a server.

At 1, using a web browser of a computer or a mobile telephone capable of web browsing, the user requests a service entity's login page.

At 2, the web server provides the service entity's login page.

At 3, upon seeing the login page, the user accesses a mobile telephone, e.g., mobile telephone 100, having multiple sequence generators, locates the sequence generator corresponding to the service entity, selects the sequence generator by pressing keys on a handset of mobile telephone 100 or via a voice response, reads the pseudorandom sequence value on the display, e.g., display 20, of mobile telephone 100 generated by the sequence generator, and enters his login ID and one-time password, i.e., a PIN concatenated with the current sequence value, on the service entity's login page. If mobile telephone 100 is resident with client, the random digit part of the one-time password may be populated automatically in the client, and the user enters the PIN portion only along with the login ID.

At 4, the client sends the user's login ID and one-time password to the web server.

At 5, the web server sends the user's login ID and one-time password to the service entity's server. The service entity's server will determine if there is a difference between the received login ID and one-time password and the stored login ID and server generated one-time password.

At 6, the service entity's server sends a message to the web server indicating success, i.e., confirmation of authentication, or failure of login.

At 7, the web server sends the client either the desired web page or a message indicating failure of login.

At 8, upon a successful login, the user may continue a session.

Figure 3:
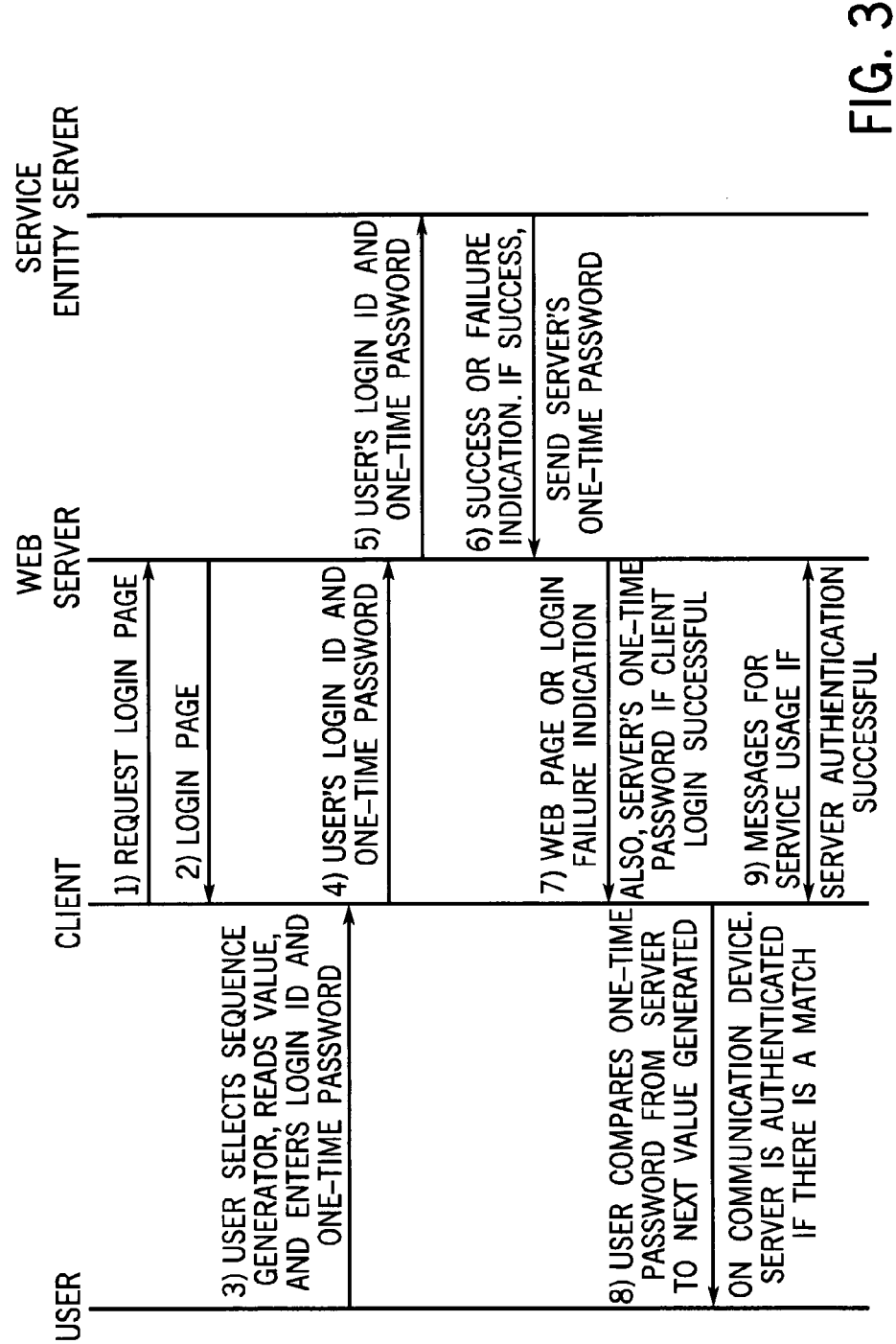
FIG. 3 shows another illustrative call flow for a method of operating the present invention arranged in accordance with the principles of the invention.

FIG. 3 shows another illustrative call flow for a method of operating the present invention arranged in accordance with the principles of the invention. Specifically, FIG. 3 illustrates two way authentication in which the user is authenticated, followed by authentication of the server.

At 1, using a web browser of a computer or a mobile telephone capable of web browsing, the user requests a service entity's login page.

At 2, the web server provides the service entity's login page.

At 3, upon seeing the login page, the user accesses a mobile telephone, e.g., mobile telephone 100, having multiple sequence generators, locates the sequence generator corresponding to the service entity, selects the sequence generator by pressing keys on a handset of mobile telephone 100 or via a voice response, reads the pseudorandom sequence value on the display, e.g., display 20, of mobile telephone 100 generated by the sequence generator, and enters his login ID and one-time password, i.e., a PIN concatenated with the current sequence value, on the service entity's login page. If mobile telephone 100 is resident with client, the random digit part of the one-time password may be populated automatically in the client, and the user enters the PIN portion only along with the login ID.

At 4, the client sends the user's login ID and one-time password to the web server.

At 5, the web server sends the user's login ID and one-time password to the service entity's server. The service entity's server will determine if there is a difference between the received login ID and one-time password and the stored login ID and server generated one-time password.

At 6, the service entity's server sends a message to the web server indicating success, i.e., confirmation of login authentication, or failure of login. Also, if the login is successful, the service entity's server sends the web server the next sequence value generated, i.e., a one-time password, on the server's sequence generator corresponding to the user.

At 7, the web server sends a message to the client indicating success or failure of login. Also, if the login is successful, the web server sends the client the one-time password generated by the service entity's server.

At 8, the user compares the one-time password generated by the service entity's server to the next sequence value generated by the sequence generator on mobile telephone 100. If there is not a difference, then the web server is authenticated. If there is a difference, an indication, e.g., a visual or audible alert, may be displayed on mobile telephone 100. The one-time password generated by the service entity's server may be compared automatically.

At 9, upon a successful login, the user may continue a session.

Figure 4:
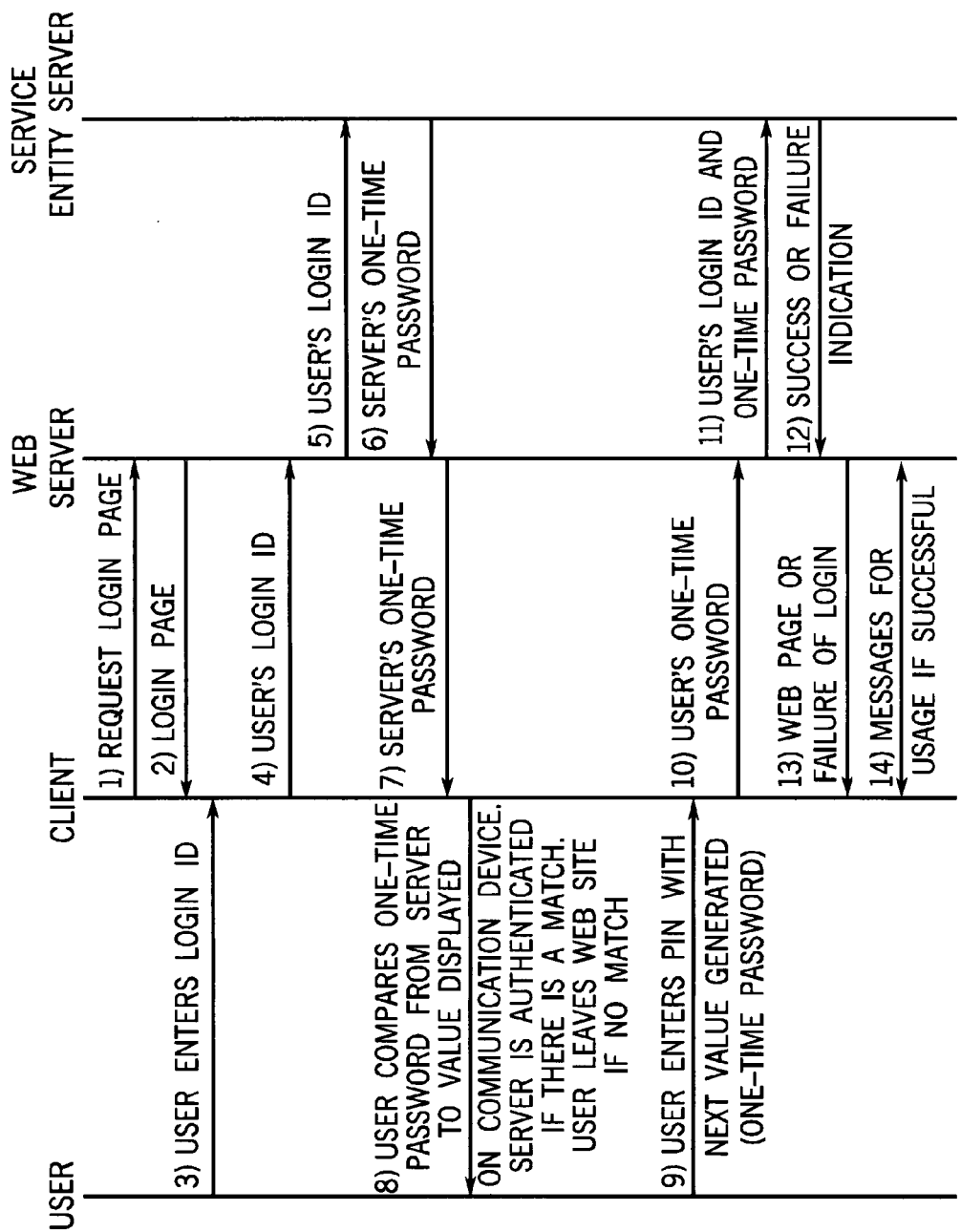
FIG. 4 shows yet another illustrative call flow for a method of operating the present invention arranged in accordance with the principles of the invention.

FIG. 4 shows yet another illustrative call flow for a method of operating the present invention arranged in accordance with the principles of the invention. Specifically, FIG. 4 illustrates two way authentication in which the server is authenticated, followed by authentication of the user. This method of operating the present invention prevents phishing attacks in which someone attempts to direct the user to a fake web site. However, phishing is only one reason for performing two-way authentication in this manner.

At 1, using a web browser of a computer or a mobile telephone capable of web browsing, the user requests a service entity's login page.

At 2, the web server provides the service entity's login page.

At 3, upon seeing the login page, the user enters his login ID on the service entity's login page.

At 4, the client sends the user's login ID to the web server.

At 5, the web server sends the user's login ID to the service entity's server. The service entity's server will determine the sequence generator at the service entity's server that corresponds to the user login ID. Upon determining the sequence generator, the service entity's server obtains the current sequence value, i.e., one-time password, from the sequence generator.

At 6, the service entity's server sends the one-time password to the web server.

At 7, the web server sends the service entity's server one-time password to the client.

At 8, the user compares the one-time password generated by the service entity's server to the current sequence value generated and displayed on mobile telephone 100. If there is a difference, then the web server is not authenticated and the user leaves the web site. If the values are identical, then the web server is authenticated via a confirmation message. If mobile telephone 100 is resident with client, the service entity's server one-time password may be checked automatically.

At 9, the user enters a PIN concatenated with the next sequence value generated by the sequence generator on mobile telephone 100 as the one-time password. If mobile telephone 100 is resident with client, the random digit part of the one-time password may be populated automatically in the client, and the user enters the PIN portion only.

At 10, the client sends the user's one-time password to the web server.

At 11, the web server sends the user's login ID and the one-time password to the service entity's server.

At 12, the service entity's server will authenticate the user by determining if there is a difference between the received login ID and one-time password and the stored login ID and server generated one-time password. Then, the service entity's server sends a message to the web server indicating success, i.e., confirmation of authentication, or failure of login.

At 13, the web server sends the client the web page or a message indicating failure of login.

At 14, upon a successful login, the user may continue a session.

Those skilled in the art will recognize that the mobile telephone display may have features that allow the user to limit a malicious person from seeing a displayed sequence value. Illustratively, the sequence values may be visible only for a short while when the user presses a button on the user input interface. Also illustratively, when performing server authentication, the user may enter the sequence value sent by the server into the mobile telephone and the mobile telephone may output a success or failure indication, instead of displaying the sequence value. Furthermore, those skilled in the art will recognize that the present invention may be used solely for server authentication using biometrics or a public/private key.

In practice, wireless telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a different order, or steps may be added, deleted, or modified.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method of using one-time passwords to authenticate access to one or more accounts of a user, the method comprising the steps of:
assigning, upon input from the user, each one of multiple sequence generators in a communications device to a different one of multiple corresponding service entities each having an account of the user and a server assigned to a corresponding one of the multiple sequence generators, wherein, upon being reset by the user, each one of the multiple sequence generators is assignable to a second different one of the multiple corresponding service entities, and wherein the assigning step further comprises the step of providing the server corresponding to each service entity with
i) a seed to a specific one of the multiple sequence generators,
ii) a key for the specific one of the multiple sequence generators, and
iii) a current pseudorandom sequence value displayed by the specific one of the multiple sequence generators, wherein the specific one of the multiple sequence generators encrypts the seed with the key to produce the current pseudorandom sequence value;
generating a subsequent pseudorandom sequence value from each one of the multiple sequence generators, wherein each of the multiple sequence generators provides access to a different one of the one or more accounts of the user;
transmitting to each assigned server a one-time password formed from concatenating a personal identification number (PIN) with a corresponding one of the subsequent pseudorandom sequence values;
receiving a confirmation from each assigned server that the server has authenticated the user for access to one of the one or more accounts on a condition that a login identification (ID) received by the server from the user matches a login ID stored by the server, and the one-time password received by the server matches a server-generated one-time password; and
receiving a second one-time password from each assigned server.

2. The method of claim 1 further comprising the steps of:
comparing, for each one of the of the multiple sequence generators, the second one-time password to a next generated pseudorandom sequence value from each one of the multiple sequence generators in the communications device; and
authenticating each assigned server on the condition that the second pseudorandom sequence value received from that server matches the next generated pseudorandom sequence value of the one of the multiple sequence generators corresponding to that server.

3. The method of claim 2 further comprising the step of producing an alert on the condition that any of the next generated pseudorandom sequence values fails to match the one-time password.

4. The method of claim 1 wherein the one-time passwords are selected from the group consisting of a) numeric values, b) alpha-numeric values, and c) alphabetical values.

5. The method of claim 1 wherein each of the multiple sequence generators generates a new pseudorandom sequence value after a predetermined interval.

6. The method of claim 5 wherein the predetermined interval is at least 30 seconds.

7. The method of claim 1 wherein the communications device is selected from the group consisting of a) a mobile telephone, b) a personal digital assistance (PDA) device, c) a two-way pager, d) a portable media player, and e) a notebook computer.

8. The method of claim 1 wherein the communications device enables the user to access the one of the one or more accounts on the server via a web interface.

9. The method of claim 1 wherein the communications device enables the user to access the one of the one or more accounts via an automatic teller machine (ATM).

10. The method of claim 1 wherein the communications device enables the user to access the one of the one or more accounts via a telephone dial-in line.

11. A communications device configured to a) assign, upon input from a user, each one of multiple sequence generators in the communications device to a different one of multiple corresponding service entities each having an account of the user and a server assigned to a corresponding one of the multiple sequence generators, wherein, upon being reset by the user, each one of the multiple sequence generators is assignable to a second different one of the multiple corresponding service entities, and wherein the communications device comprises an administrative screen for assignments that enables the user to provide the server corresponding to each service entity with
i) a seed to a specific one of the multiple sequence generators,
ii) a key for the specific one of the multiple sequence generators, and
iii) a current pseudorandom sequence value displayed by the specific one of the multiple sequence generators, wherein the specific one of the multiple sequence generators encrypts the seed with the key to produce the current pseudorandom sequence value;
b) generate a pseudorandom sequence value from each one of the multiple sequence generators, wherein each of the multiple sequence generators provides access to a different one of one or more accounts of the user;
c) transmit to each assigned server a one-time password formed from concatenating a personal identification number (PIN) with a corresponding one of the pseudorandom sequence values;
e) receive a confirmation from each assigned server that that server has authenticated the user for access to one of the one or more accounts on a condition that a login identification (ID) received by the server from the user matches a login ID stored by the server, and the one-time password received by the server matches a server-generated one-time password; and
f) receive a second one-time password from each assigned server.

12. The communications device of claim 11, wherein the communications device is configured to display a failure indication on the condition that the second one-time password received from one of the servers fails to match a next generated pseudorandom sequence value generated by the sequence generator corresponding to the one server.

13. The communications device of claim 11, wherein the communications device is configured to display a success indication on the condition that the second one-time password received from one of the servers matches a next generated pseudorandom sequence value generated by the sequence generator corresponding to the one server.

14. The communications device of claim 11 wherein one time passwords are selected from the group consisting of a) numeric values, b) alpha-numeric values, and c) alphabetical values.

15. The communications device of claim 11, wherein the communications device is configured to generate a different pseudorandom sequence value from each one of the multiple sequence generators after a predetermined interval.

16. The communications device of claim 15 wherein the predetermined interval is at least 30 seconds.

17. The communications device of claim 11, wherein the communications device is configured to display a menu of the multiple sequence generators available in the communications device.

18. The communications device of claim 11, wherein the communications device is selected from the group consisting of a) a mobile telephone, b) a personal digital assistance (PDA) device, c) a two-way pager, d) a portable media player, and e) a notebook computer.

19. A method of using one-time passwords to provide two-way authentication of a server and a user, the method comprising the steps of:
receiving, at the server, a login identification (ID) from the user;
transmitting, at the server in response to the received login ID, a first one-time password to the user;
receiving, at the server, a confirmation of authentication from the user on a condition that the first one-time password and a current sequence value displayed on a communications device of the user are identical;
receiving, at the server, a second one-time password from the user, wherein the second one-time password is generated from one of multiple sequence generators in the communications device, and wherein each one of the multiple sequence generators is assigned by the user to a different one of multiple corresponding service entities each having an account of the user and a server assigned to a corresponding one of the multiple sequence generators, and wherein, upon being reset by the user, each one of the multiple sequence generators is assignable to a second different one of the multiple corresponding service entities, and wherein the assignment to the second different one of the multiple corresponding service entities comprises the step of providing a server for the second different one of the multiple corresponding service entities with
i) a seed to a specific one of the multiple sequence generators,
ii) a key for the specific one of the multiple sequence generators, and
iii) a current pseudorandom sequence value displayed by the specific one of the multiple sequence generators, wherein the specific one of the multiple sequence generators encrypts the seed with the key to produce the current pseudorandom sequence value; and
transmitting, at the server, an indication of successful login to the user upon authentication of the second one-time password, wherein the authentication of the second one-time password enables the user to access one of one or more accounts on the condition that the login ID received from the user matches a stored login ID stored, and the second one-time password matches the first one-time password.

20. The method of claim 19 wherein the second one-time password comprises a personal identification number (PIN) concatenated with a next generated pseudorandom sequence value.

21. A method, comprising the steps of:
receiving a one-time password formed from a personal identification number (PIN) concatenated with a pseudorandom sequence value generated from one of multiple sequence generators in a communications device of a user, wherein each one of the multiple sequence generators is assigned by the user to a different one of a multiple corresponding service entities each having an account of the user and a server assigned to a corresponding one of the multiple sequence generators, and wherein, upon being reset by the user, each one of the multiple sequence generators is assignable to a second different one of the multiple corresponding service entities, and wherein the assignment to the second different one of the multiple corresponding service entities comprises the step of providing the server for the second different one of the multiple corresponding service entities with
i) a seed to a specific one of the multiple sequence generators,
ii) a key for the specific one of the multiple sequence generators, and
iii) a current pseudorandom sequence value displayed by the specific one of the multiple sequence generators, wherein the specific one of the multiple sequence generators encrypts the seed with the key to produce the current pseudorandom sequence value;
transmitting a confirmation of authentication to the user for access to one of one or more accounts on a condition that a received login identification (ID) from the user is identical to a stored login ID, and the one-time password received from the user is identical to a server-generated one-time password; and
transmitting a second one-time password to the user.

22. The method of claim 1 further comprising the step of selecting one of the multiple sequence generators to generate the pseudorandom sequence value, wherein each one of the multiple sequence generators is viewable in a display of the communications device.

23. The method of claim 22 wherein each of the multiple sequence generators are selected to generate the pseudorandom sequence value from the group consisting of a) pressing keys on a handset of the communications device, b) touching a touch screen on the display, and c) a voice response.

24. The method of claim 1 wherein the step of assigning further comprises the step of synchronizing each one of the multiple sequence generators with the server of the corresponding one of the multiple service entities.

25. A non-transitory computer-readable medium having computer executable instructions, the computer executable instructions adapted to implement a method comprising:
enabling a user of a communications device to assign each one of multiple sequence generators in the communications device to a) a different one of a multiple corresponding service entities each having an account of the user and a server assigned to a corresponding one of the multiple sequence generators and b) a second different one of the multiple corresponding service entities upon resetting, by the user, each one of the multiple sequence generators,
wherein the enabling the user of the communications device to assign each one of the multiple sequence generators allows the user to provide the server corresponding to each service entity with
i) a seed to a specific one of the multiple sequence generators, ii) a key for the specific one of the multiple sequence generators, and
  iii) a current pseudorandom sequence value displayed by the specific one of the multiple sequence generators, wherein the specific one of the multiple sequence generators encrypts the seed with the key to produce the current pseudorandom sequence value; and
  wherein the multiple sequence generators are configured to generate a different pseudorandom sequence value after an interval variable by the user;
  enabling the user to receive a confirmation from each assigned server that that server has authenticated the user for access to one of the one or more accounts on a condition that a login identification (ID) received by the server from the user matches a login ID stored by the server, and the one-time password received by the server matches a server-generated one-time password; and
  enabling the user to receive a second one-time password from each assigned server.

26. The communications device of claim 11 wherein the communications device comprises a touch screen or speech recognition capabilities to enable the user to select each of the multiple sequence generators.

27. The method of claim 1 wherein each one of the multiple sequence generators is configured to generate a different pseudorandom sequence value after an interval variable by the user.

* * * * *